(12) United States Patent
Bergman et al.

(10) Patent No.: US 11,550,133 B2
(45) Date of Patent: Jan. 10, 2023

(54) DIRECTIONAL LED ARRAY WITH OPTICAL FOIL STRUCTURE TO REDIRECT LIGHT

(71) Applicant: SIGNIFY HOLDING B.V., Eindhoven (NL)

(72) Inventors: Anthonie Hendrik Bergman, Nuenen (NL); Bartel Marinus Van De Sluis, Eindhoven (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 17/424,743

(22) PCT Filed: Jan. 21, 2020

(86) PCT No.: PCT/EP2020/051360
§ 371 (c)(1),
(2) Date: Jul. 21, 2021

(87) PCT Pub. No.: WO2020/156876
PCT Pub. Date: Aug. 6, 2020

(65) Prior Publication Data
US 2022/0137381 A1    May 5, 2022

(30) Foreign Application Priority Data
Jan. 31, 2019 (EP) ..................... 19154751

(51) Int. Cl.
*G02B 19/00* (2006.01)
*F21V 5/00* (2018.01)
(Continued)

(52) U.S. Cl.
CPC .......... *G02B 19/0061* (2013.01); *F21V 5/007* (2013.01); *F21V 7/0083* (2013.01); *F21Y 2105/10* (2016.08); *F21Y 2115/10* (2016.08)

(58) Field of Classification Search
CPC ... G02B 19/0061; F21V 5/007; F21V 7/0083; F21Y 2105/10
See application file for complete search history.

(56) References Cited

U.S. PATENT DOCUMENTS 6,250,774 B1 * 6/2001 Begemann .............. F21S 8/086
362/240
7,775,700 B2    8/2010 Lee
(Continued)

FOREIGN PATENT DOCUMENTS

DE    102009060565 A1    6/2011
WO    98/33007 A1    7/1998
(Continued)

*Primary Examiner* — Rajarshi Chakraborty
*Assistant Examiner* — Michael Chiang

(57) ABSTRACT

The invention provides a lighting system (100) comprising: —a plurality of n light sources (10), wherein each of the n light sources (10) is configured to generate light source light (11); —a plurality of n first beam shaping elements (20), wherein each of the n first beam shaping elements (20) is configured downstream of a respective light source (10); —k arrays (300) of optical elements (310), wherein each of the k arrays (300) comprises nk optical elements (310), wherein each of the nk optical elements (310) is configured downstream of a respective first beam shaping element (20) from a subset (250) of the n first beam shaping elements (20); wherein the optical elements (310) are configured to influence one or more of (i) a beam direction of the light source light (11), (ii) a beam shape of the light source light (11), (iii) a spectral distribution of the light source light (11), and (iv) an intensity of the light source light (11); and wherein n≥2, k≥1, and 1≤$n_k$≤n.

15 Claims, 7 Drawing Sheets

(51) Int. Cl.
*F21V 7/00* (2006.01)
*F21Y 105/10* (2016.01)
*F21Y 115/10* (2016.01)

(56) References Cited

U.S. PATENT DOCUMENTS

| | | |
|---|---|---|
| 2009/0231845 A1 | 9/2009 | Lee |
| 2013/0301264 A1* | 11/2013 | Van Gompel ......... F21V 17/005 |
| | | 362/236 |
| 2015/0085482 A1 | 3/2015 | Murdoch |
| 2016/0298822 A1 | 10/2016 | Michiels et al. |
| 2017/0023211 A1 | 1/2017 | Sepkhanov et al. |
| 2017/0219186 A1* | 8/2017 | Enno ..................... F21V 7/0091 |
| 2018/0313521 A1 | 11/2018 | Jurik et al. |
| 2019/0003677 A1* | 1/2019 | Gloss ................. G02B 19/0009 |
| 2022/0090764 A1* | 3/2022 | Seronveaux ............ F21V 5/007 |

FOREIGN PATENT DOCUMENTS

| | | |
|---|---|---|
| WO | 2011025244 A2 | 3/2011 |
| WO | 2015181149 A1 | 12/2015 |
| WO | 2017001259 A1 | 1/2017 |

* cited by examiner

US 11,550,133 B2

DIRECTIONAL LED ARRAY WITH OPTICAL FOIL STRUCTURE TO REDIRECT LIGHT

CROSS-REFERENCE TO PRIOR APPLICATIONS

This application is the U.S. National Phase application under 35 U.S.C. § 371 of International Application No. PCT/EP2020/051360, filed on Jan. 21, 2020, which claims the benefit of European Patent Application No. 19154751.2, filed on Jan. 31, 2019. These applications are hereby incorporated by reference herein.

FIELD OF THE INVENTION

The invention relates to a lighting system as well as to a kit of parts, e.g. to assemble such lighting system. The invention also relates to a method for providing such lighting system. Yet further, the invention relates to a specific use of the lighting system.

BACKGROUND OF THE INVENTION

Beam shaping is essential in all lighting applications. One category of beam shaping optical elements includes classical elements such as reflectors and collimators as used in most luminaires. Traditionally, elements belonging to this category are bulky whereas those in the second category are difficult to design and expensive to manufacture. Solutions for influencing a beam of light are known in the art. US2016/0298822, for instance, describes a lighting unit comprising an arrangement of a plurality of light source units configured to emit light, a first foil comprising a plurality of transmissive first foil regions, wherein each first foil region comprises a plurality of optical elements comprising an optical element with refractive functionality to the light source unit light in a center of each region and an optical element with total internal reflection functionality to the light source unit light in a peripheral area remote from said center in each region, and a second foil comprising a plurality of transmissive second foil regions, wherein each second foil region comprises a plurality of optical elements wherein each second foil region comprises at its center an optical element with refractive functionality to the light source unit light and in a peripheral area remote from its center an optical element with total internal reflection functionality to the light source unit light, wherein each light source unit has a corresponding first foil region configured downstream of said light source unit and a corresponding second foil region configured downstream of said first foil region.

SUMMARY OF THE INVENTION

LEDs continue to become more compact while becoming more powerful. Compact LED arrays can be produced whereby each LED node has a collimator to direct the light in a direction perpendicular to the LED array. There also use cases, however, whereby multiple lighting directions are desired. For instance, for mimicking directional daylight or to adjust object illumination in a presentation area to properties (e.g. position, height) of the object. A LED array whereby LED nodes are combined with an array of collimators can be produced in a relatively simple way. However, sometimes multiple light beam directions are desired. Producing a directional LED array is complex if individual LED nodes and/or optical elements have different orientations. Likewise, it may be difficult to control other lighting properties with conventional solutions.

Hence, it is an aspect of the invention to provide an alternative lighting system (and/or method of providing such system), which preferably further at least partly obviates one or more of above-described drawbacks. The present invention may have as object to overcome or ameliorate at least one of the disadvantages of the prior art, or to provide a useful alternative.

In embodiments, the invention comprises a directional lighting array, whereby each light node has an identical collimator, and the collimated light array is partly or entirely covered by one or more optical foils each covering a subset of the collimated LED nodes to redirect the collimated light. In specific embodiments, one or more optical foil sheets are applied which cover the entire LED array while the sheet is adjusted to have a (repeating) pattern of various optical areas. In a specific version of this embodiment, the foil can have holes at positions which are aligned with the light nodes of which the light does not need to be redirected. Alternatively, the optical foil with the (punched) holes may be attached to (e.g. glued on) a transparent sheet in order to create more mechanical stability. In embodiments, the optical foil itself may also be produced to have an array of various optical (repeating) areas which are aligned with the LED nodes. Optical options include redirection (both in theta $\theta$ as in phi $\phi$ directions), beam width, beam shape and color filter. Examples of these are optical redirect foils or (holographic) diffusing foil. Embodiments, of the proposed invention may make it easy to assemble the entire array stack during production, but may also enable one or more optical foil sheets to be added or attached to the collimated LED array in a late-stage configuration stage. In embodiments, the invention can be applied to a linear (1D) LED array, e.g. by using one or more foils having a "comb" structure but may in embodiments also applied to a 2D LED array, whereby e.g. in embodiments one or more optical foil sheets provide varying optical redirects for individual LED nodes. Especially, optical foils may be flexible and can be bent. Hence, the invention may also be used to create a flexible, bendable directional light array, by applying the optical foil(s) to a collimated LED array which is mounted on a flexible substrate.

Hence, in an aspect the invention provides a lighting system comprising: (a) a plurality of n light sources, wherein each of the n light sources is configured to generate light source light; (b) a plurality first beam shaping elements, especially a plurality of n first beam shaping elements, wherein each of the (n) first beam shaping elements is configured downstream of a respective light source; (c) k arrays of optical elements, wherein each of the k arrays comprises $n_k$ optical elements, wherein each of the $n_k$ optical elements is configured downstream of a respective first beam shaping element from a subset of the n first beam shaping elements; wherein the optical elements are configured to influence one or more of (e.g.) (i) a beam direction of the light source light, (ii) a beam shape of the light source light, (iii) a spectral distribution of the light source light, and (iv) an intensity of the light source light; and wherein $n \geq 4$, $k \geq 2$, and wherein in specific embodiments $1 < n_k < n$, wherein at least two of the k arrays are comprised by a single element comprising one or more openings, wherein at least two of the k arrays have complementary shapes, and wherein an optical element part of a first array fits in an opening of an adjacent second array.

Such lighting system may be relatively easily assembled. Further, such lighting system may allow a late-stage configuration to choose the desired optical properties, such as by late-stage choosing or designing one or more of the arrays. Further, such lighting system allows relatively easily choosing the optical properties, as with k arrays, and with controllable light sources, the optical properties may be controlled. Further, such system may also allow a rational use of prefabricated foils with optical elements, which may be processed in single elements with optical elements, which single elements may basically have the same influence on the beam, but by choosing the configuration of the single elements relative to the light sources, may nevertheless have different influences on the beam (such as mirrored redirections of the light source beams by a mirrored configuration of the single elements. With the lighting system it may be possible to control one or more of (i) a beam direction, (ii) a beam shape, (iii) a spectral distribution, and (iv) an intensity of the light emanating from the lighting system. For instance, without moving mechanical elements, the beam shape and/or beam direction may be changed.

As indicated above, the lighting system comprises a plurality of light sources, a plurality of first beam shaping elements, with in principle each first beam shaping element associated with a respective light source, and one or more arrays of optical elements which influence the light source light of one or more of the light sources, and which optical elements are configured downstream of the first beam shaping elements.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Hence, the lighting system comprises a plurality of n light sources, wherein each of the n light sources is configured to generate light source light.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources. Therefore, especially the n light sources comprise solid state light sources.

Even though the term "light source" may herein refer to a plurality of light sources, such as a COB, the term "light source" herein especially refers to a light source, or a plurality of light sources, associated with a single first beam shaping element. Hence, the term "light source" may especially herein LED package or a COB package. The light source and first beam shaping element may in embodiments be provided as a single component. However, other embodiments are also possible (see also below).

The n light sources are especially configured to generate one or more of visible radiation (visible light) and infrared IR radiation. Hence, in embodiments the light source light comprises one or more of visible radiation and IR radiation. In embodiments, the light sources may be configured to generate IR radiation. Especially, in embodiments the light source light (essentially) comprises visible light.

Hence, in embodiments the n light sources are especially configured to generate visible light. The light of the light sources may be white light or may be colored light. There may also be a plurality of subsets of light sources, wherein the light sources of different subsets mutually differ in e.g. one or more of color point and color temperature (but within the respective subsets the one or more of color point and color temperature may be essentially the same).

The term "white light" herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL. The terms "visible", "visible light" or "visible emission" refer to light having a wavelength in the range of about 380-780 nm.

The number n of light sources is especially n≥4, such as in embodiments n≥8, like in specific embodiments n≥10.

In embodiments, the light sources may be configured in a linear (i.e. 1D) array of light sources, with at least 2, such as at least 4, like at least 8, even more especially at least 10 light sources. For long arrays, n may even be up to e.g. 1,000, or even up to 10,000, or even more. In other embodiments, the light sources may be configured in a 2D array, with each array comprising at least two light sources, such as an $n_1 * n_2$ array, wherein $n_1$ and $n_2$ each independently are at least 2 (and wherein $n_1 * n_2 = n$). For large arrays, n may be even up to e.g. 10,000, or even up to 1,000,000, or even more.

In embodiments, the n light sources may be divided in at least m subsets of each at least one or more light sources. Hence, especially 2≤m≤n. The subsets may be individually controlled. Hence, in embodiments the light sources within each subset are not individually controlled, but the light sources within each subset are controlled as respective subset. Hence, a control system may e.g. control intensity of the light source light generated by the light sources within a subset.

In embodiments, the optical properties of the light source light of the light sources (yet upstream of the optical elements) of two or more different subsets may differ, such as in terms of color point and color temperature. However, in (other embodiments) optical properties of the light source light of the light sources (yet upstream of the optical elements) of two or more different subsets may be essentially identical. As indicated herein, the optical elements may change the optical properties of the light source light. Hence, even when the optical properties of the light source light of the light sources (yet upstream of the optical elements) of two or more different subsets may be essentially identical, their optical properties may mutually differ downstream of the optical elements.

Note that in embodiments where there are a plurality of subsets of light sources, it may also be possible that the light source light of the light sources (yet upstream of the optical elements) of two or more different subsets may differ and optical properties of the light source light of the light sources (yet upstream of the optical elements) of two or more different subsets, other than the afore mentioned light sources, may be essentially identical.

Therefore, in embodiments the plurality of n light sources comprises at least two subsets of each one or more light sources, wherein the lighting system further comprises a control system, wherein the control system is configured to control an intensity of the light source light generated by the light sources of the respective at least two subsets. Alternatively, the lighting system may be functionally coupled to a control system.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

As indicated above, the lighting system may further comprise a plurality first beam shaping elements, especially a plurality of n first beam shaping elements, wherein each of the (n) first beam shaping elements is configured downstream of a respective light source. Hence, especially in embodiments downstream of each light source, a first beam shaping element is configured. Therefore, in embodiments the number of first beam shaping elements and the number of light sources may be identical. Each first beam shaping element may comprise one or more optical first beam shaping elements. In embodiments, the beam shaping may comprise lenses. In embodiments, the first beam shaping elements may comprise collimators. In embodiments, the first beam shaping elements are especially configured such that the light source light is shaped in a beam to be (substantially) projected onto the optical element configured downstream of the first beam shaping element, would one of the optical elements be configured downstream of the first beam shaping element. In embodiments, one or more first beam shaping elements may (each) comprise a plurality of first beam shaping elements. For instance, a first beam shaping element may comprise a lens and a collimator.

Especially, the first beam shaping elements are hollow or comprise a light transmissive material, such that the light source light can emanate through the first beam shaping elements.

In specific embodiments, the first beam shaping elements of the plurality of first beam shaping elements are all identical.

In yet further specific embodiments, at least the first beam shaping elements associated to the one or more light sources with a subset of light sources are identical. Hence, in embodiments there may also be a plurality of subsets of first beam shaping elements, wherein the first beam shaping elements of different subsets mutually differ (but within the respective subsets the first beam shaping elements may be essentially identical). In embodiments, first beam shaping elements may differ in one or more of (i) the difference in cross-sectional shape they impose on the beam of light source light escaping from the first beam shaping elements (but yet upstream of the optical elements), (ii) optical axis direction they impose on the beam of light source light escaping from the first beam shaping elements (but yet upstream of the optical elements), and (iii) intensity distribution of the beam of the light source light escaping from the first beam shaping elements (but yet upstream of the optical elements).

In general, all the first beam shaping elements are configured in a plane, which may be flat or which comprise one or more bent parts, and the optical axes of the beam of light source light escaping from the first beam shaping elements (but yet upstream of the optical elements) may all have essentially the same angle relative to the plane, in general perpendicular. Hence, especially when first beam shaping elements would differ, they may differ in one or more of (i) the difference in cross-sectional shape they impose on the beam of light source light escaping from the first beam shaping elements (but yet upstream of the optical elements), (ii) intensity distribution of the beam of the light source light escaping from the first beam shaping elements (but yet upstream of the optical elements).

Especially, however, as also indicated above, in embodiments all the (n) first beam shaping elements are essentially the same.

Yet further, the lighting system comprises k arrays of optical elements, wherein each of the k arrays comprises $n_k$ optical elements, wherein each of the $n_k$ optical elements is configured downstream of a respective first beam shaping element, especially configured downstream of a respective first beam shaping element from a subset of the n first beam shaping elements.

Hence, in embodiments downstream of all first beam shaping elements an optical element is configured. However, especially there may be a first subset of first beam shaping elements of which downstream of each of the (one or more) first beam shaping elements an optical element is configured, and there may be a second subset of first beam shaping elements of which downstream of each of the (one or more) first beam shaping elements no optical element is configured.

Especially, the optical elements are configured to influence one or more of (i) a beam direction of the light source light, (ii) a beam shape of the light source light, (iii) a spectral distribution of the light source light, and (iv) an intensity of the light source light.

Though one or more optical elements may (in theory) essentially identical to the first beam shaping elements (of which they are configured downstream), in general all optical elements will (in practice) differ from the first beam shaping elements.

As indicated above, the one or more of the optical elements may be configured to influence (i) a beam direction of the light source light. This may especially imply that the optical axis of the (beam of) light source light downstream of such optical elements has another direction than upstream of the optical element. Hence, in embodiments one or more of the plurality of optical elements are configured to redirect the light source light of the respective light sources, especially such that an optical axis of the light source light downstream of the optical elements has an angle selected from the range of smaller than 1800 and larger than 900 relative to the optical axis of the light source light upstream of the optical element. Especially, in embodiments the angle may be selected from the range of smaller than 180° and larger than 150°. Hence, the optical axis may be redirected by up to about 30°. Hence, influencing a beam direction may thus imply a redirection of the optical axis. To this end, the optical element may comprise a (part of an) optical turning film or direction turning foils. Optical turning films or direction turning foils are known in the art, and are e.g. described in U.S. Pat. No. 7,775,700B2, which is herein incorporated by reference.

Alternatively, or additionally, as indicated above, the one or more of the optical elements may be configured to influence (ii) a beam shape of the light source light. This may especially imply that the beam shape of the (beam of) light source light downstream of such optical elements has another shape than upstream of the optical element. In embodiments, the optical elements may be configured to change the cross-sectional shape of the beam, such as from circular to oval. In embodiments, the optical elements may be configured to broaden (or to narrow) the beam shape. To this end, e.g. a (further or second) lens or a (further or second) collimator may be applied; for instance, a Fresnel lens as optical element may be applied. In embodiments, the optical elements may be configured to broaden the beam shape. Hence, in embodiments downstream of one or more of the plurality of n first beam shaping elements, second beam shaping elements may be configured. To this end, e.g. a (further or second) lens or a (further or second) collimator may be applied. In embodiments, the optical elements may be configured to diffuse the light source light. To this end, the optical element may comprise a (anisotropic) diffuser.

Alternatively, or additionally, as indicated above, the one or more of the optical elements may be configured to influence (iii) a spectral distribution of the light source light. This may especially imply that the color point of the light source light downstream of such optical elements has another value than upstream of the optical elements. To this end, a color filter and/or luminescent material may be applied. The former may be based on the fact that part of the light source light is absorbed (and not converted into visible light of another wavelength), leading to another spectral distribution of the light source light downstream of the optical elements. The latter may be based on the fact that at least part of the light source light is absorbed and converted into luminescent material light, (also) leading to another spectral distribution of the light source light downstream of the optical elements. Note that e.g. an optical element configured to influence the spectral distribution may also influence the beam shape. For instance, in embodiments optical elements comprising an absorbing material may be used that is also scattering. Hence, in addition to another spectral distribution, also another spatial distribution of the light source light downstream of the optical elements may be obtained.

Yet further, alternatively or additionally, as indicated above, the one or more of the optical elements may be configured to influence (iv) an intensity of the light source light. This may especially imply that the power (watt) of the light source light downstream of such optical elements is lower than upstream of the optical elements. Especially, these embodiments refer to optical elements comprising "grey filters", i.e. optical filters that have a relative even absorption in the visible wavelength range. For instance, the transmission at each wavelength within the visible wavelength range may be within +/−30%, such as +/−20%, of an average transmission in the visible wavelength range, with of course all values larger than 0% transmission and equal to or smaller than 100% transmission. Especially, the indicated transmission values may apply for the entire visible wavelength range. Would colored light source light be produced by the light sources, then these transmission values may apply for the wavelength range in which the light sources provide colored light source light.

Hence, in embodiments one or more of the plurality of optical elements may be configured to influence the light source light by one or more of (i) diffusing the light source light, (ii) reducing the intensity of the light source light, and (iii) changing the spectral distribution of the light source light.

As already indicated above, in embodiments one or more optical elements may provide more than one function selected from influencing (i) a beam direction of the light source light, (ii) a beam shape of the light source light, (iii) a spectral distribution of the light source light, and (iv) an intensity of the light source light. Further, one or more optical elements may also comprise a combination of two or more different optical elements. In general, however, only a single optical element is applied (should an optical element be configured downstream of a first beam shaping element.

As indicated above, especially n≥2.

Further, as indicated above, especially k≥2. This especially implies that downstream of one or more first beam shaping elements the optical elements are configured. Hence, in embodiments there is at least a single array comprising one or more optical elements, wherein each optical element is configured downstream of one of the plurality of n first beam shaping elements. The array includes $n_k$, optical elements. In embodiments, one or more arrays may include n optical elements, wherein each optical element is configured downstream of one of the plurality of n first beam shaping elements.

Especially, however, for at least one of the k arrays, it may apply that there are less optical elements than there are first beam shaping elements. In other words, for such array applies $2 \leq n_k < n$. In embodiments, $n_k < n$ as it may be desirable that the light source light downstream of one or more first beam shaping elements is not further influenced, or influenced by another array. Therefore, in specific embodiments for one or more, especially for each array, may $2 \leq n_k < n$ apply.

Hence, there are at least two arrays, i.e. k is 2 or larger, and the at least two array includes less optical elements than the total number n of first beam shaping element (wherein each optical element is configured downstream of one of the n first beam shaping elements).

With more than one array, in embodiments an optical element of first array may be configured upstream of an optical element of a second array. In further embodiments, a first array may be configured upstream of a second array. Hence, two or more arrays may be configured in a stack of arrays, with a second array configured downstream of a first array, and a third array configured downstream of a second array, etc.

However, in general the k arrays, when k is equal to or larger than 2, are configured adjacent of each other. For instance, the k arrays may be configured in essentially the same plane. Hence, in embodiments downstream of those first beam shaping elements of which an optical element is configured, only an optical element of a single array is configured. Each array comprises $n_k$ optical elements. Hence, a first array may comprise $n_1$ optical elements, a second array may comprise $n_2$ optical elements, etc. Hence, the numbers of optical elements within different array are not necessarily the same. However, in embodiments the number of optical elements within two or more different arrays (of the two or more arrays) may be the same.

In specific embodiments, the $n_k$ value of the optical elements in the specific array may be identical to the number of light sources of one of the subsets, assuming there are one or more subsets. Especially, an array may be functionally coupled to a subset of one or more light sources. Hence, in embodiments there are k arrays and there are m subsets of each one or more light sources, wherein m=k. Further, the number of l light sources in the respective subset may be identical to the number of $n_k$ optical elements in the respective array.

Hence, in embodiments there may be m subsets, wherein each of the m subsets comprise $m_1$ light sources. In embodiments, $1 \leq m_j < n$. The number of light sources $m_j$ may depend upon the subset. For instance, a first subset comprises $m_1$ light sources and a second subset comprises $m_2$ light sources, etc. As indicated above, in general when there are subsets, each light source is within a single subset. In embodiments, there may be two or more subsets of the total number of subsets with different numbers of light sources. In other embodiments, there may be two or more subsets of the total number of subsets with the same number of light sources. In embodiments, the sum of all $m_j$ values ($\Sigma_{j=1}^{m} m_j$) may be n or less than n, as not necessarily downstream of each first beam shaping element an optical element may be configured.

When there are m subsets of light sources, in embodiments there are thus also m number of arrays, wherein each subset of light sources of the m subsets of light sources is functionally coupled to one of the m number of arrays. More especially, each optical element of a specific array out of the number of m arrays is functionally coupled to a light source of the subset of light sources with which the array is functionally coupled.

Therefore, in embodiments the light sources and the optical elements (and thus also the openings (if any)) may be configured such that optical properties of the light source light emanating from the system based on the light source light of the light sources of a first subset comprising one or more light sources and of a second subset comprising one or more (other) light sources are the same within the first subset and are the same within the second subset, but mutually differ between the first subset and second subset. Of course, there may be more than two subsets; then the same principle may apply. The different subsets of light sources may be controlled by the control system. In this way, the light that is provided by the lighting system (i.e. lighting system light) may be controlled. Dependent upon the light source light provided by subsets of one or more light sources, the light emanating from the may differ in one or more of (i) a beam direction, (ii) a beam shape, (iii) a spectral distribution, and (iv) an intensity. The latter control parameter may be provided anyhow when a plurality of individually controllable (subset of) light sources is provided. However, the latter control parameter may even be controlled with the same number of (identical) light sources and/or may be combined with one or more of the former control parameters.

As indicated above, the array may comprise one or more optical elements. The total number of optical elements may be equal to or less than the total number n of first beam shaping elements. Hence, there may thus also be first beam shaping elements downstream of which not optical elements are configured. Hence, in embodiments the one or more arrays of the k arrays may (independently) include one or more openings.

The term "optical element" may also refer to a plurality of optical elements configured downstream of a single first beam shaping element. Hence, in embodiments, the term "optical element" may also refer to a stack of optical elements, configured downstream of a single first beam shaping elements. Hence, one or more arrays of optical elements may comprise one or more stacks of optical elements. Further, the availability of the optical elements, does not exclude the availability of further optical elements. However, these are herein not further discussed.

Hence, in specific embodiments one or more of the k arrays are comprised by a single element comprising one or more openings, wherein each of the one or more openings is configured downstream of one of the $n-n_k$ first beam shaping elements not belonging to the respective subset of the n first beam shaping elements, and wherein one or more of the $n_k$ optical elements comprise a collimator. In other words, the openings may be configured downstream of those first beam shaping elements of the second subset of first beam shaping elements of which downstream of each of the (one or more) first beam shaping elements no optical element is configured (see also above).

A way to provide an array allowing the availability of one or more optical elements and optionally one or more openings, e.g. a foil may be applied. The foil may be used as such, or the foil may be available on a support. Instead of a foil, a plate may be used. Other options may also be possible.

In a specific embodiment, a comb-like structure may be provided, wherein along a support, at one side, or at both sides, or alternatingly, optical element parts and/or openings may be provided. Hence, in specific embodiments, one or more of the one or more single elements have a comb-like shape, wherein each of the one or more single elements comprise one or more optical elements parts, wherein each of the one or more optical elements parts comprise a respective optical element, wherein each of the one or more single elements comprise a support, wherein along the support the one or more optical element parts and the one or more openings are configured. An element part may e.g. be a larger part, e.g. a rectangular part, wherein the optical element, like an optical element having a circular cross-section, may be provided.

The single element may also be indicated as single body or as monolithic body. However, the monolithic body in embodiments may be thin and/or small; the monolithic body may in embodiments be flexible. The single element may thus be made of a single piece of material, such as a single piece of polymeric material.

The single element may be part of a device. The single element may also be configured detachable to a support for the plurality of light sources and/or a support for the plurality of first beam shaping elements (which in embodiments may be the same support). Hence, in embodiments the lighting system may comprise a first part, wherein the first part comprises the plurality of n light sources and the plurality of n first beam shaping elements, wherein one or more of the one or more single elements are configured detachable to the first part. The first part may in embodiments also be indicated as "lighting device". The single element may thus be part of the lighting device or may be functionally coupled to the lighting device, optionally in detachable way. A detachable configuration of the single element allows late stage configuration or replacement with new or alternative single elements, e.g. for the sake of repair, or as other types of beams, and/or beam directions, and/or light is desirable.

In specific embodiments, two or more of the single elements may have complementary shapes. In embodiments, the shapes of the single elements may be chosen such, that from a single foil or plate of identical optical elements, single elements may be derived, such as by cutting, which may, dependent upon their configuration, may have different influences on the beams of the light sources. For instance, assuming a foil or plate with optical elements having the same pitch as the first beam shaping elements, e.g. optical elements for beam angle redirection, at least four different angles may be created from the same foil or plate, dependent upon the configuration of the single element relative to the first beam shaping elements.

Hence, with k≥2, the optical elements that are configured to redirect the light source light of the respective light sources of at least two of the k arrays may all be identical but a direction of a redirection of the light source light of the at least two of the k arrays may mutually differ.

In specific embodiments, it may also be chosen to provide single bodies that have complementary shapes. In this way, e.g. within a single array of first beam shaping elements, the light source light may be influenced differently for two or more of the respective first beam shaping elements. Hence, with k≥2, at least two of the k arrays may have complementary shapes. In such embodiments, e.g. an optical element part of a first array may fit in an opening of an adjacent second array. One or more of the openings may be larger than a single optical element part, such as twice as large, which allows hosting two optical element parts. This may e.g. be of relevance when even more than two complementary single bodies are applied. In specific embodiments, the lighting system may comprise a set of three arrays, wherein a first array and an adjacent second array have complementary shapes, and wherein the second array and an adjacent third array have complementary shapes. Hence, in specific embodiments the lighting system may comprise a set of two or more single elements, wherein a first single element and an adjacent second single element have complementary shapes (and wherein optionally the second single element and an adjacent optional third single element have complementary shapes). Of course, in embodiments the lighting system may also comprise a plurality of (different) sets of two or three (or more) arrays.

As indicated above, one or more of the k arrays are comprised by a foil, wherein the foil comprises the respective $n_k$ optical elements (and optionally the one or more openings). A single foil can comprise a single 1D array of optical elements. In other embodiments, a single foil may comprise two or more arrays of optical elements. Especially, the foil comprises a polymeric foil. This may e.g. provide flexibility to the lighting device and/or may allow a relative thin lighting device or lighting system. A single foil is especially an embodiment of a single element.

Alternatively or additionally, the lighting system comprises a second foil comprising the first beam shaping elements. A single foil may comprise a single 1D array of first beam shaping elements. In other embodiments, a single element may comprise two or more arrays of first beam shaping elements. Even more especially, a single foil may comprise all first beam shaping elements. Especially, such second foil may comprise a polymeric foil. This may e.g. provide flexibility to the lighting device and/or may allow a relative thin lighting device or lighting system.

Hence, in specific embodiments both the arrays and the first beam shaping elements are comprised by a (polymeric) foil, respectively.

The foils or plates mentioned herein, may especially comprise light transmissive material. The polymeric material may comprise light transmissive material. Even more especially, the foil or plates mentioned herein may especially comprise light transparent material. Further, even more especially the polymeric material may especially comprise light transparent material. Hence, the light transmissive material may especially be light transparent material. Here, the term "light" especially refers to visible light. The light transmissive material may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl) methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transmissive material may comprise polyethylene terephthalate (PET). Hence, the light transmissive material is especially a polymeric light transmissive material. However, in another embodiment the light transmissive material may comprise an inorganic material. Especially, the inorganic light transmissive material may be selected from the group consisting of glasses, (fused) quartz, transmissive ceramic materials, and silicones. Also hybrid materials, comprising both inorganic and organic parts may be applied. Especially, the light transmissive material comprises one or more of PMMA, transparent PC, or glass.

In yet a further aspect, the invention also provides a single element per se. Hence, in an aspect the invention also in a single element comprising one or more (of the k) arrays and optionally one or more openings. Especially, in embodiments the single element may in embodiments have a comb-like shape, wherein each of the one or more single elements comprise one or more optical elements parts, wherein each of the one or more optical elements parts comprise a respective optical element, wherein the single element comprises a support, wherein along the support the one or more optical element parts and the one or more openings may be configured.

The lighting system may thus in embodiments comprise a plurality of n units, especially arranged in a 1D array or in a 2D array, wherein each unit comprises a light source and a beam shaping element. Downstream of one or more of the units, one or more optical elements may be configured. The one or more optical elements may be provided as one or more 1D or 2D arrays, which may be configured downstream of the plurality of n units (especially arranged in a 1D array or in a 2D array). When the units are configured as 1D array, there may be one or more 1D arrays of the optical elements. When the units are configured as 2D array, there may be one ID arrays and/or one or more 2D arrays of the optical elements.

It may also be useful to provide a lighting device and one or more single elements suitable for such lighting device, to allow a user install the single element desired. Hence, in an aspect the invention also provides a kit of parts comprising (i) a first part ("lighting device") comprising the plurality of n light sources and the plurality of n first beam shaping elements as defined herein, and (ii) one or more of the one or more single elements as defined herein. The term "kit of parts" especially refers to two or more items (parts) that may be distinct, but which are—in the context of the invention—designed to be used together. Especially, to two or more items (parts) may be designed to be arranged into a single arrangement, such as a device, apparatus or system. The term "kit of parts" may refer to the two or more items in a physical kit, but this is not necessarily the case. Together, the two or more items may provide a desired effect. The desired effect, herein, is especially the provision of the herein described lighting device or lighting system.

Hence, the invention also provides a method of assembling such lighting system. In an aspect, the invention provides a method of providing a lighting system as defined herein, comprising providing a first part comprising the plurality of n light sources and the plurality of n first beam shaping elements as defined herein, and arranging k arrays of optical elements, as defined herein, to the first part. This may allow to an essentially fixed arrangement or to a detachable arrangement of the k arrays.

The lighting system as described herein may especially be used for one or more of wall washing lighting, target lighting, accent lighting, attention seeking lighting, shop lighting, museum lighting, and garden lighting, such as for one or more of wall washing lighting, target lighting, accent lighting, daylight mimicking lighting.

For instance, in embodiments shop lighting may be provided that is different in the morning, during lunch, afternoon, and after closing time (e.g. depending on the intended and present audience. In embodiments, lighting can be used to draw attention to a product or part of the shop. For instance, in embodiments in a museum (or gallery) lighting may now be provided that may easily be adapted to a new collection.

The lighting may be provided dynamically. Hence, any place that may benefit from (wild) dynamic lighting may use the lighting system.

In embodiments, the light source may be unobtrusive, but may also be between an observer and the object to be illuminated. In order to see an object it has to be illuminated from 'the front'. This can be a light source behind the viewer (which than might create a shadow) or something in between the viewer and the object. In present day shop-windows the light source may e.g. be either on the floor or on the ceiling. A compromise in the direction. The proposed new option can be in either vertical or horizontal structure of the shop window itself, in an unobtrusive way.

In embodiments, garden lighting may be provided, that may be (subtle) dynamic. Or, in embodiments lighting may be provided that is dynamic both in time as well as in space.

As LED-based lighting may not suffer at all from frequent on-off switching dynamic lighting has no downside on the lifetime of the system. Lighting designers still must get acquainted on this newly acquired feature. The described system may also have no mechanical moving parts to change beam direction and/or shape. These new features may be embraced by lighting designers and the application may only be limited by their imagination. We will also see an increase of interactive, reactive lighting systems as sensors of all kind can become part of the controlling system.

The lighting system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, etc. The lighting system may also be applied in a 3D TV.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
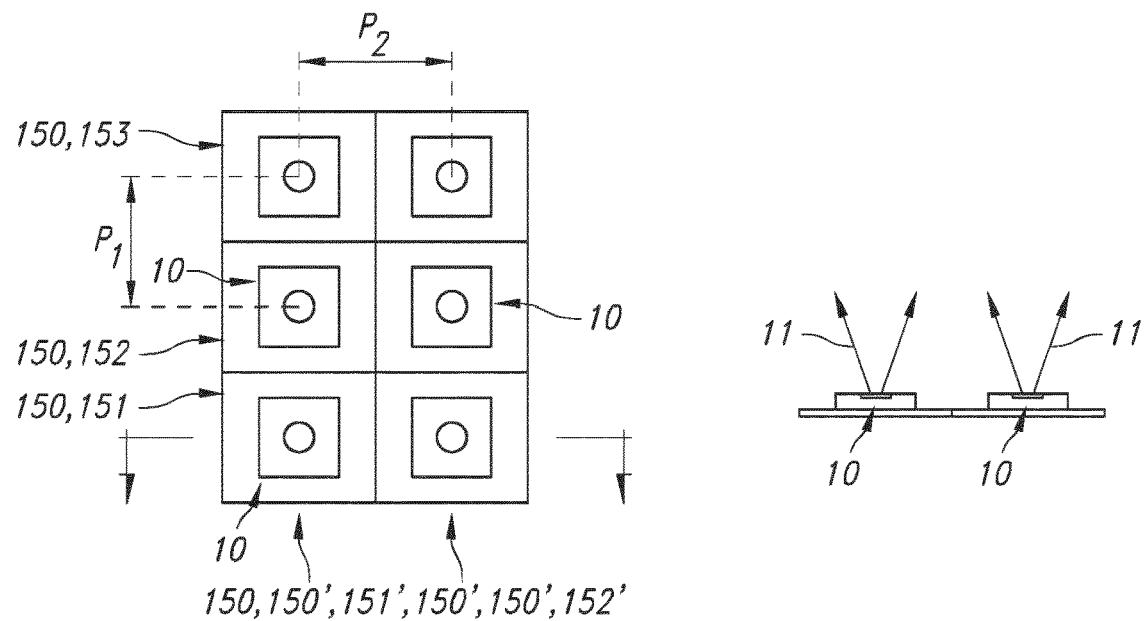
FIG. 1a-1f schematically depict some aspects.
Figure 1B:
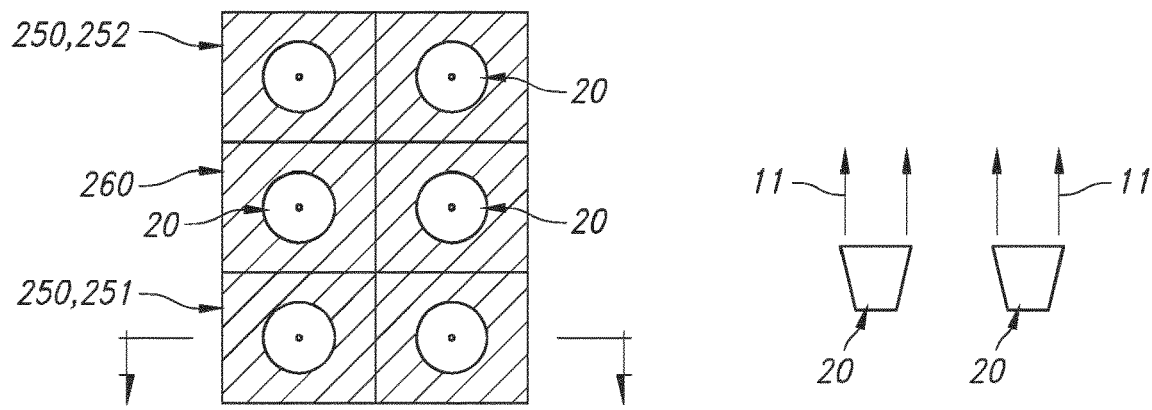
Figure 1C:
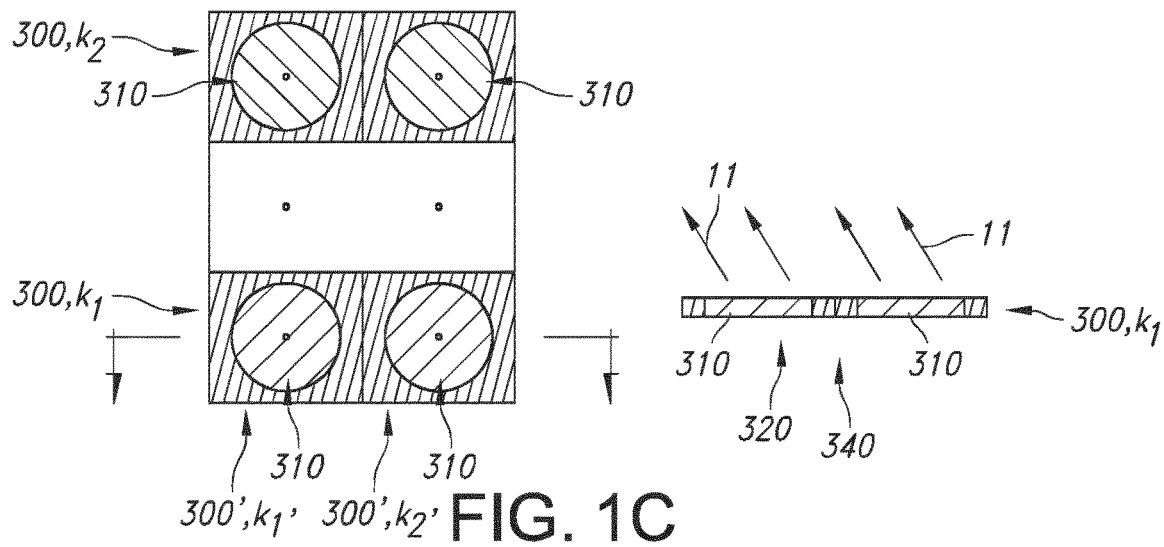
Figure 1D:
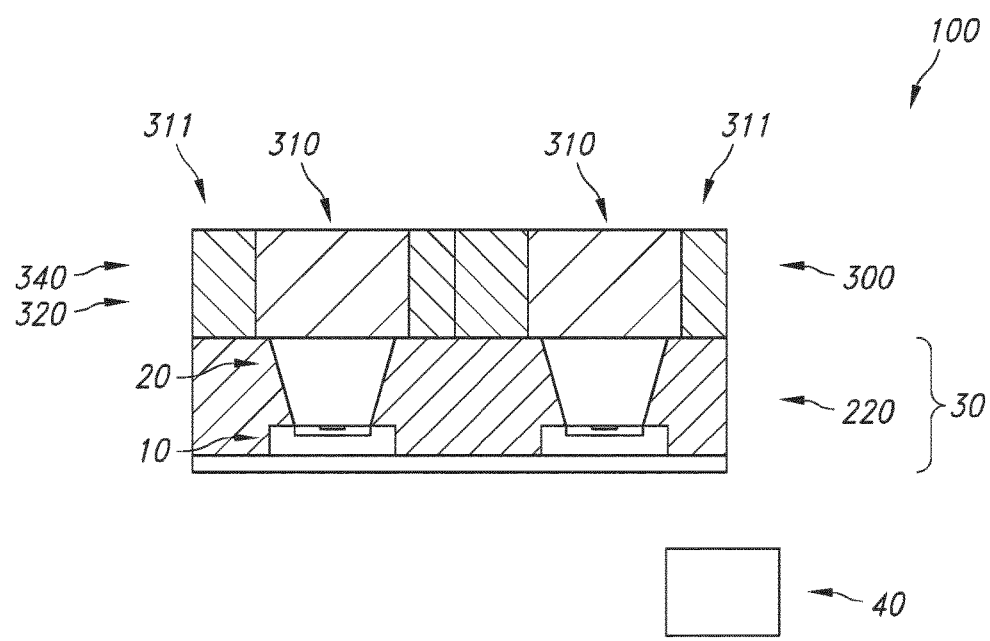
Figure 1E:
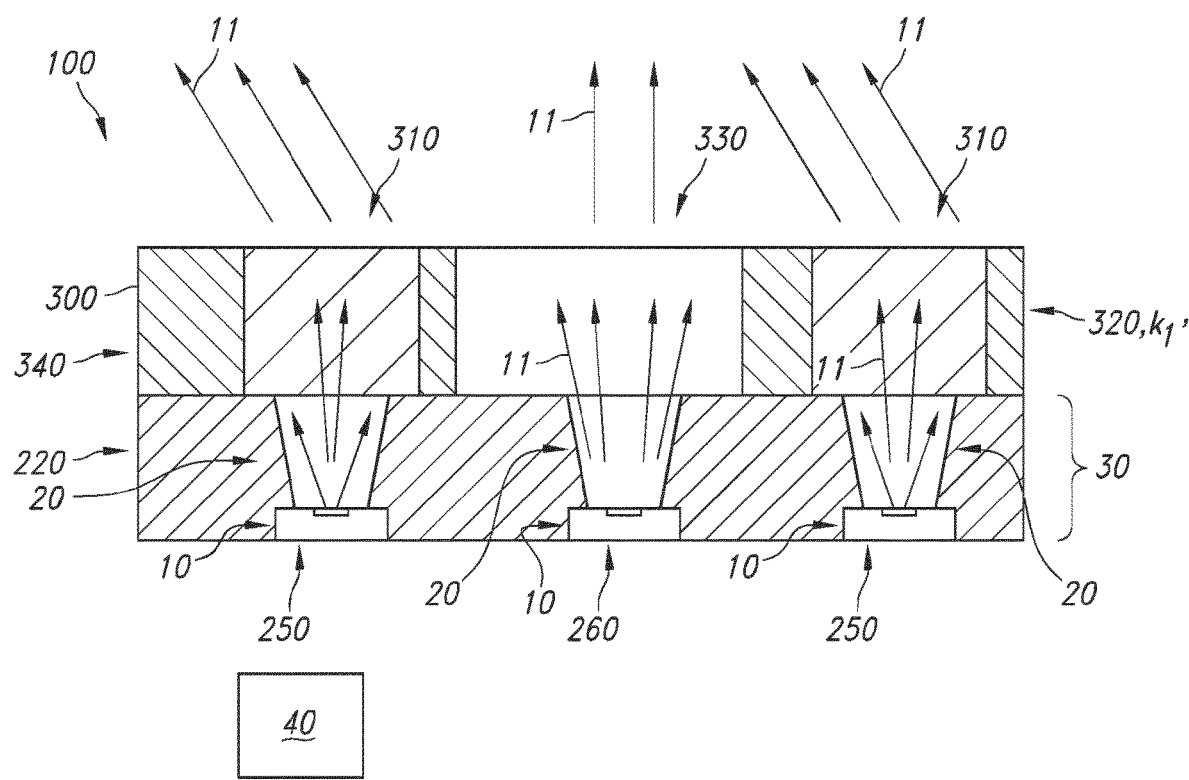

FIGS. 1a-1c schematically depict cross-section in a plane of the light sources (1a), first beam shaping elements (1b), and optical elements (1c) of a schematic embodiment of a lighting system 100, which is schematically depicted in FIGS. 1d and 1e.

FIG. 1a schematically depicts a plurality of n light sources 10. From one row of light sources 10, another cross-section is schematically depicted. Each of the n light sources 10 is configured to generate light source light 11. Here, n is by way of example 6.

In FIG. 1a different subset 150 of light sources 10 may be defined. A non-limiting number of examples is given:
- there may be three subsets 150, indicated with first subset 151, second subset 152, and third subset 153, respectively, with, in this embodiment each two light sources 10. Hence, in this embodiment there are three arrays of each two light sources; or
- there may be two subsets 150, indicated for the sake of distinction with reference 150', wherein the two subsets 150' are indicated with first subset 151' and second subset 152', respectively, with, in this embodiment each three light sources 10. Hence, in this embodiment there are two arrays of each three light sources.

FIG. 1a and further figures also show dots which show the center point of the relevant element in FIG. 1a the light sources 10; in FIG. 1b the first beam shaping elements 20; in FIG. 1c the optical elements 310 or openings 330. Hence, the distance P1 or the distance P2 may be the pitch, in the respective directions. Especially, the pitch P1 and the pitch P2 may be essentially identical.

For instance, the n light sources 10 may be solid state light sources, like LEDs. In embodiments, they are essentially all the same (in terms of power and optical properties).

FIG. 1b schematically depicts a plurality of n first beam shaping elements 20. The first beam shaping elements 20 may e.g. be lenses or collimators (or lenses and collimators). From one row or array of first beam shaping elements 20, a cross-section is schematically depicted. Here, by way of example collimators are shown. As can be seen in FIG. 1d, each of the n first beam shaping elements 20 is configured downstream of a respective light source 10. Here, n is thus again 6.

FIG. 1c schematically depicts k arrays 300 of optical elements 310. For the sake of explanation, the arrays are explained as two possible options (though there may be more possible options):
- At the left side, it is indicated that there are two arrays 300, indicated with k1 and k2, respectively. Each of these k arrays 300 comprises $n_k$ optical elements 310. Here, by way of example, k=2. Further, by way of example, $n_k$ is for both arrays 2. Between the two arrays, there is a space (or array) without optical elements 310. Hence, in an embodiment and example is provided wherein downstream of not all first beam shaping elements see also below an array is configured. From one array of optical elements 310, a cross-section is schematically depicted; or
- At the bottom side, it is indicated that there are two arrays 300, indicated with k1' and k2', respectively. Each of these k arrays 300 comprises $n_k$ optical elements 310. Here, by way of example, k=2. Further, by way of example, $n_k$ is for both arrays 2. Both arrays, however, comprise an opening. Hence, in another embodiment and example is provided wherein downstream of not all first beam shaping elements see also below an array is configured.

The optical elements 310 are configured to influence one or more of (i) a beam direction of the light source light 11, (ii) a beam shape of the light source light 11, (iii) a spectral distribution of the light source light 11, and (iv) an intensity of the light source light 11. For instance, the optical elements may be selected from e.g. optical filters, beam direction turning optical elements, (anisotropic) scattering elements, etc.

FIGS. 1a-1c (and further figures), also show that the lighting system 100 may thus in embodiments comprise a plurality of n units (schematically depicted by the squares), especially arranged in a 1D array or in a 2D array (here a 2D array), wherein each unit comprises a light source 10 and a beam shaping element 20. Downstream of one or more of the units, one or more optical elements 310 may be configured. The one or more optical elements 310 may be provided as one or more 1D or 2D arrays, which may be configured downstream of the plurality of n units (especially arranged in a 1D array or in a 2D array). When the units are configured as 1D array, there may be one or more 1D arrays of the optical elements. When the units are configured as 2D array, there may be one 1D arrays and/or one or more 2D arrays of the optical elements (see also the description below of FIGS. 1d and 1e). FIGS. 1a-1c may be considered to schematically depict six "nodes".

As shown in FIG. 1d also in combination with FIGS. 1b and 1c, each of the $n_k$ optical elements 310 is configured downstream of a respective first beam shaping element 20 from a subset 250 of the n first beam shaping elements 20. When going back to FIG. 1b, it is shown that there is a subset 250 of four first beam shaping elements 20. There may also be two of such subsets 250, with each one or more of the first beam shaping elements. Hence, FIG. 1b also by way of example shows a first subset 251 with two first beam shaping elements 20, and a second subset 252 of first beam shaping elements 20. There is also a further subset 260 comprising one or more first beam shaping elements 20, here two. Even though different subsets of first beam shaping elements can be defined, all first beam shaping elements 20 may essentially be the same. One could also define the subsets as combination of light source 10 and first beam shaping element 20, as upstream of each first beam shaping element 20, there is a light source 10 see e.g. also FIG. 1d. Now, when turning again to FIG. 1c, it is shown that there are two positions without optical elements 310. When assuming k1' and k2' indicating the arrays, then these arrays comprise openings (see also below). Hence, when these arrays are configured downstream of the first beam shaping elements 20, effectively the subset 250 of first beam shaping elements 20 is created, of which downstream the optical elements 310 are configured, and the further subset 260 of first beam shaping elements 20 is created, of which downstream no optical elements 310 are configured.

As indicated above, FIG. 1c may also be interpreted as with two rays k1' and k2'. A cross-section of the lighting system 100 based on this interpretation is shown in FIG. 1e. Here, the array 300 of optical elements 310, e.g. k1' as k1' is essentially identical to k2' includes two optical elements 310, but also an opening 330. By way of example, the optical elements 310 are direction turning optical elements, indicated with the light rays; hence, the light rays of the middle light source 10 are beam shaped with the first beam shaping element 20, but then substantially not altered anymore.

A control of the light sources 10 on the bases of the above defined subsets 150, see FIG. 1a may be according to the first embodiment of subsets 150, i.e. first subset 151, second subset 152, and third subset 153, or according to the first embodiment of subsets 150, i.e. subsets 150', i.e. first subset 151' and second subset 152'. As indicated above, more option may be possible; these subsets are only provided and schematically depicted for the sake of understanding. Control along the first embodiment may have as advantage that the first and the third subset 151,153 may be used to provide the influenced light source light 11 and the second subset 152 may be used to provide the non-influenced light source light 11.

Reference 40 indicated a control system. The plurality of n light sources 10 may thus comprises at least two subsets 150 of each one or more light sources 10. The control system 40 may be configured to control an intensity of the light source light 11 generated by the light sources 10 of the respective at least two subsets 150.

As schematically depicted in FIG. 1*d*, one or more of the k arrays 300 may be comprised by a single element 320 comprising one or more openings 330, wherein each of the one or more openings 330 is configured downstream of one of the n-$n_k$ first beam shaping elements 20 not belonging to the respective subset 250 of the n first beam shaping elements 20, wherein one or more of the $n_k$ optical elements 310 comprise a collimator. In FIG. 1*e*, these subsets 250 as well as the further subset 260 are also indicated. However, it is to be noted that these subsets are effectively arranged in a plane perpendicular to the plane of drawing.

As schematically depicted in FIGS. 1*c*, 1*d* and 1*e*, one or more of the k arrays 300 may be comprised by a first foil 340, wherein the foil 340 comprises the respective $n_k$ optical elements 310 and the one or more openings 330. Hence, the single element may comprise a foil. The foil 340 may comprise a polymeric foil.

As schematically depicted in FIGS. 1*d* and 1*e*, a second foil 220 may be provided comprising the first beam shaping elements 20. The second foil 240 may (also) comprise a polymeric foil.

Referring to amongst others FIGS. 1*d* and 1*e*, in embodiments the lighting system 100 may comprise a first part 30, wherein the first part comprises the plurality of n light sources 10 and the plurality of n first beam shaping elements 20. In embodiments, one or more of the one or more single elements 320 may be configured detachable to the first part 30.

Figure 1F:
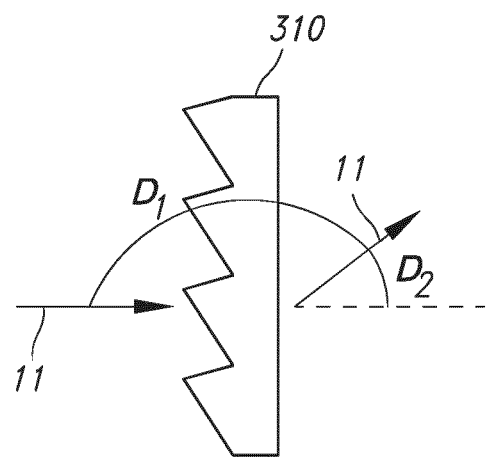

FIG. 1*f* schematically depicts an embodiment of a direction turning foil (DTF). Such foil may e.g. include microscopic, asymmetrical prismatic structures embedded in the film that change the light beam direction.

FIGS. 1*d*, 1*e*, and 1*f* shows that embodiments may be provided wherein one or more of the plurality of optical elements 310 are configured to redirect the light source light 11 of the respective light sources 10, such that an optical axis of the light source light 11 downstream of the optical elements 310 has an angle selected from the range of smaller than 1800 and larger than 900 relative to the optical axis of the light source light 11 upstream of the optical element 310.

In embodiments, the invention may thus comprise a directional lighting array, whereby each light node has an identical collimator, and the collimated light array is partly or entirely covered by one or more optical foils each covering a subset of the collimated LED nodes to redirect the collimated light.

Possibly, in embodiments one or more optical foil sheets are applied which cover the entire LED array while the sheet is adjusted to have a (repeating) pattern of various optical areas. In a simple version of this, the foil can in embodiments have holes at positions which are aligned with the light nodes of which the light does not need to be redirected. Alternatively, the optical foil with the (punched) holes may in embodiments be attached to (e.g. glued on) a transparent sheet in order to create more mechanical stability. The optical foil itself may in embodiments also be produced to have an array of various optical (repeating) areas which are aligned with the LED nodes. Optical options include redirection (both in θ as in φ directions), beam width, beam shape and color filter. Examples of these are optical redirect foils or (holographic) diffusing foil. The proposed invention makes in embodiments it easy to assemble the entire array stack during production, but also enables in embodiments one or more optical foil sheets to be added or attached to the collimated LED array in a late-stage configuration stage. The invention can in embodiments be applied to a linear (1D) LED array, e.g. by using one or more foils having a "comb" structure but can also be applied to a 2D LED array, whereby one or more optical foil sheets provide varying optical redirects for individual LED nodes. Since optical foils are flexible and can be bended, the solution can in embodiments also be used to create a flexible, bendable directional light array, by applying the optical foil(s) to a collimated LED array which is mounted on a flexible substrate.

In an embodiment, the principle of the invention may in embodiments be applied to a linear (1D) LED array combined with one or more foils having a "comb"-like structure. The comb-liked structure enables a single foil structure comprising the individual redirect cells being aligned with the individual LED node collimators. Multiple of such comb-structured foils can be applied in such a way that a sequence of redirect structures is applied to the linear collimator array. By logically grouping or controlling the LED nodes having the same redirect foils, the beam direction of the entire spotlight array can in embodiments be adjusted such that three beam directions are supported.

Figure 2A:
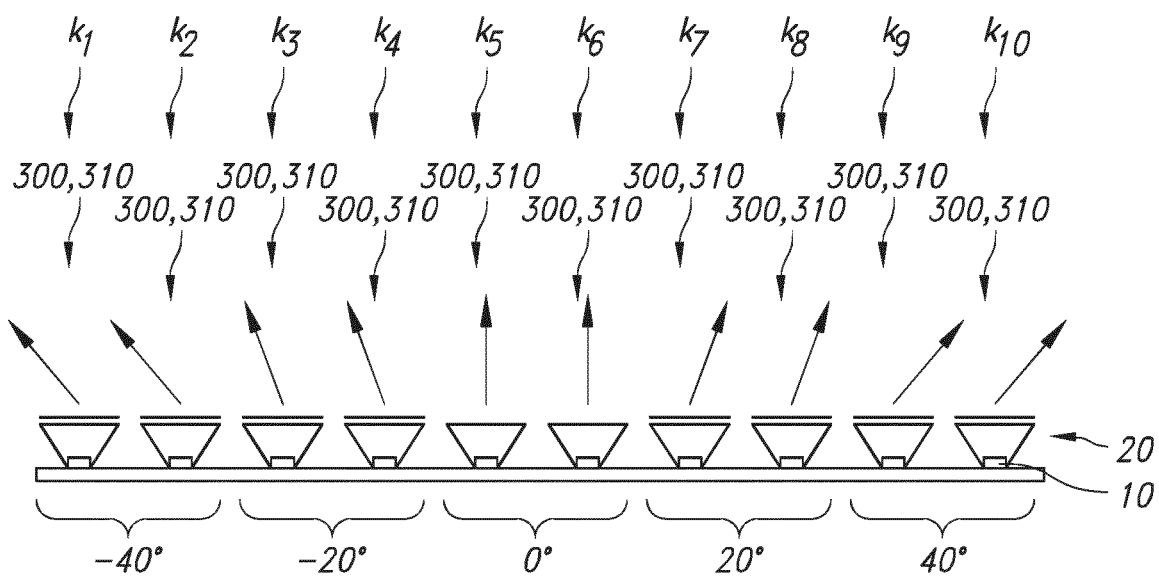
FIGS. 2a-2e schematically depicts some further aspects, amongst others in relation to arrays of optical elements, such as single elements comprising such optical elements.

Various variations are possible, dependent on the application and desired directional light effects. For instance, FIG. 2*a* shows an embodiment comprising a symmetrical sequence of redirect foils. The symmetrically arranged arrows indicate the symmetrical sequence of the optical elements. Here by way of example 10 arrays 300 (perpendicular to the plane of drawing) are depicted. However, FIG. 2*a* may also relate to a linear array 300 in the plane of drawing, i.e. perpendicular to the plane of drawing there are no further elements (openings 330 or optical elements 310, collimators 20 and light sources 10, etc.), than schematically depicted.

Figure 2B:
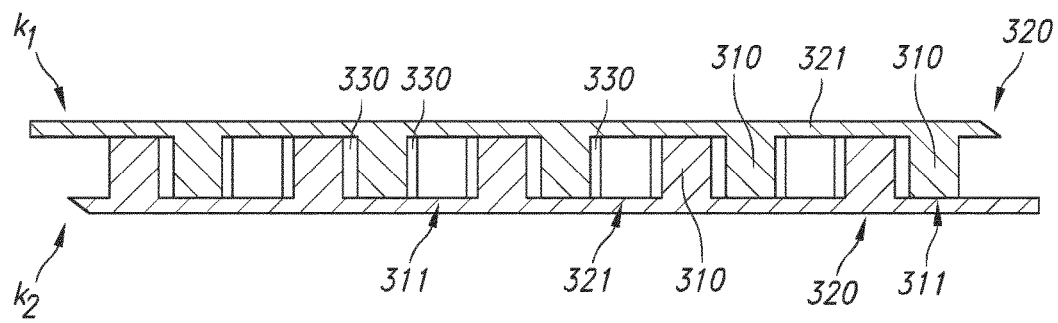
Figure 2C:
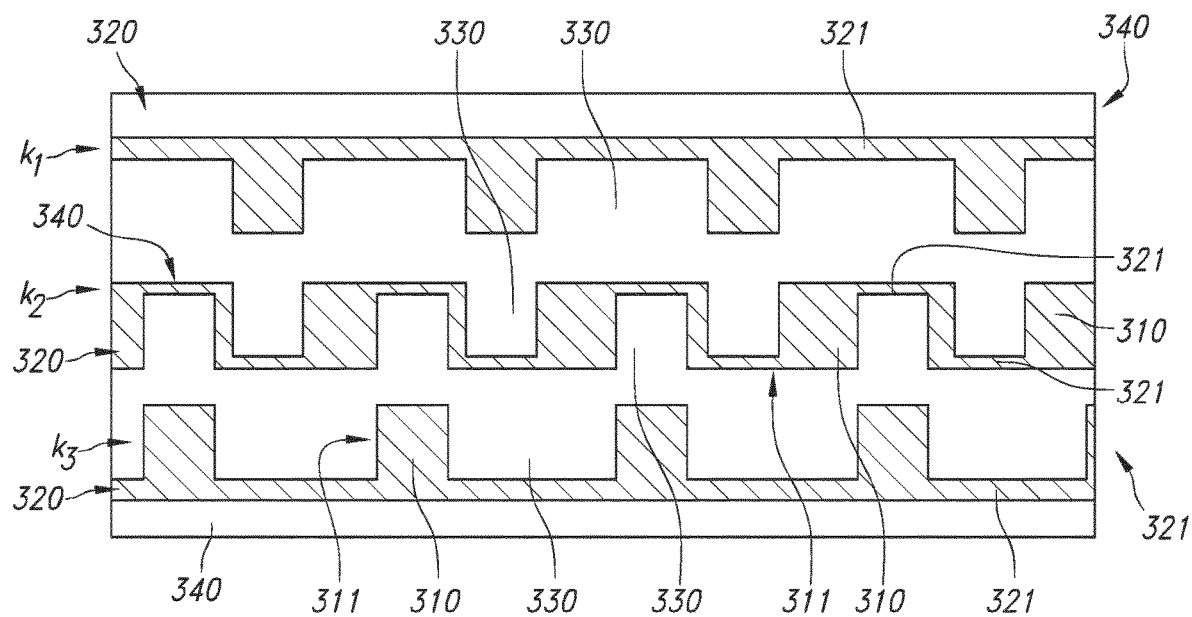

The following FIG. 2*b*-2*c* show some examples of how this can be implemented depending on the application.

FIG. 2*b* schematically depicts an embodiment of a linear array of LEDs with identical collimators. Covered with two strips of cut redirection foil. LEDs marked c are uncovered and the beam is not affected. LEDs marked a are redirected in one direction while the ones marked b are directed the opposite direction. FIG. 2*c* schematically depicts an embodiment with actually cut pieces of a beam redirection foil by a simple Silhouette CAMEO cutting machine.

Hence, in embodiments one or more of the one or more single elements 320 may have a comb-like shape, wherein each of the one or more single elements 320 comprise one or more optical elements parts 311, wherein each of the one or more optical elements parts 311 comprise a respective optical element 310, wherein each of the one or more single elements 320 comprise a support 321, wherein along the support 321 the one or more optical element parts 311 and the one or more openings 330 are configured. In the specific embodiments schematically depicted in FIGS. 2*b* and 2*c*, the optical element parts 311 are essentially the same as the optical elements, as the entire foil that is used as basis for the optical elements has the optical redirection function. However, as schematically depicted in FIG. 1*c*, the optical element part 311 may comprise the optical element 310.

Hence, in embodiments the support may be straight. In other embodiments, the support may have a kind of zigzag structure (see FIG. 2b or 2c).

As schematically depicted in FIGS. 2b and 2c, at least two of the k arrays 300 may have complementary shapes, wherein an optical element part 311 of a first array 300 fits in an opening 330 of an adjacent second array 300 (see FIGS. 2b and 2c). Even more especially, a set of three arrays 300 may be provided, wherein a first array 300 and an adjacent second array 300 have complementary shapes, and wherein the second array 300 and an adjacent third array have complementary shapes. However, other option may also be possible, with e.g. even more than three arrays that have complementary shapes.

Figure 2D:
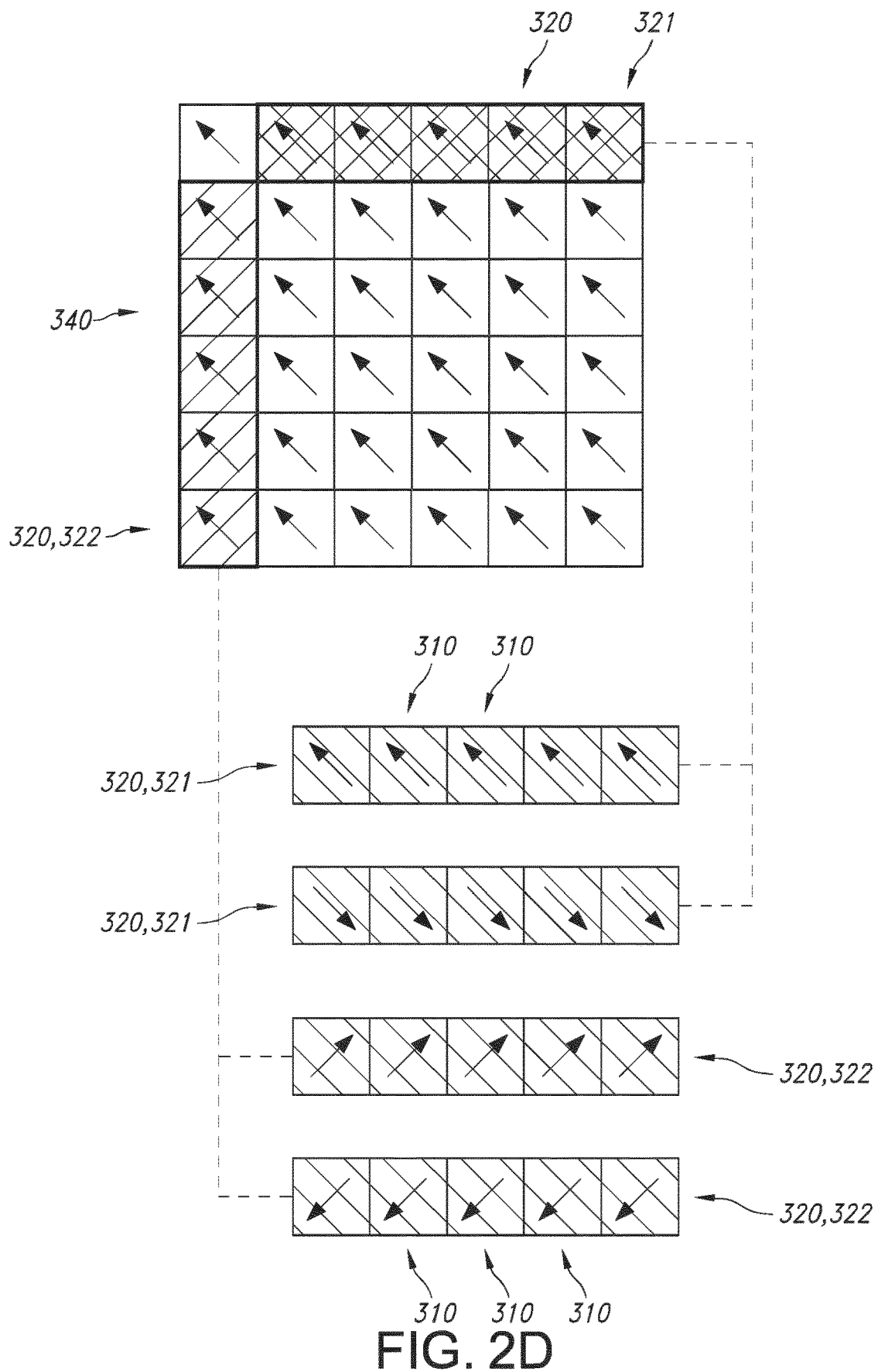

FIG. 2d very schematically depicts how with a single foil 340 having redirection properties, indicated with the arrow, and array of five light sources and first beam shaping elements can be provided with four different redirection directions. By way of example, two single elements 320, indicated with references 321 and 322 are generated from the foil 340. Each single element can be placed in two different ways. Hence, four different directions are provided.

Hence, FIG. 2d also shows that even based on a single redirection foil it may be possible that the optical elements 310 that are configured to redirect the light source light 11 of the respective light sources 10 of at least two of the k arrays 300 are all identical but wherein a direction of a redirection of the light source light 11 of the at least two of the k arrays 300 mutually differ (see also FIG. 2a).

Figure 2E:
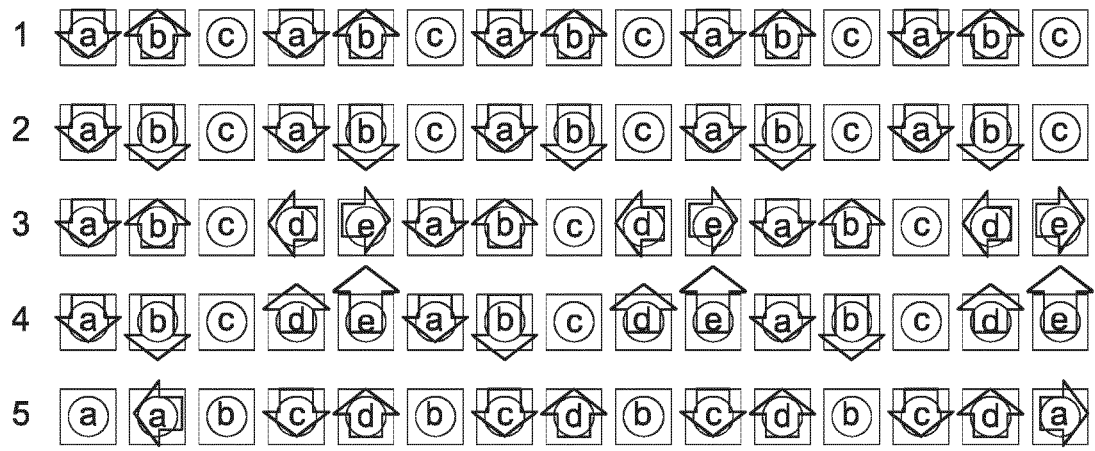

FIG. 2e very schematically depicts an embodiment with a few examples how a redirection might be applied.

No 1: marked a say 10° down in the picture in reality one way perpendicular to the array and marked b up. Marked c are not redirected.

No 2. marked a 10° down, marked b 20° down, c unaffected

No 3. a: 10° down, b: 10° up, c: straight, d: 10° left, e: 10° right. Redirecting sideways can have an impact on the shadows.

No 4. a: 10° down, b: 20° down, c: straight, d: 10° up, e: 20° up

No 5. a: 10° outwards, b: straight, c: 10° down, d: 10° up

Hence, the light sources 10 and the optical elements 310 may in embodiments be configured such that optical properties of the light source light 11 emanating from the system 100 based on the light source light 11 of the light sources 10 of a first subset 150 comprising one or more light sources and of a second subset 150 comprising one or more (other) light sources are the same within the first subset 150 and are the same within the second subset 150, but mutually differ between the first subset 150 and second subset 150. However, in other embodiments different subsets may not mutually differ.

Figure 3A:
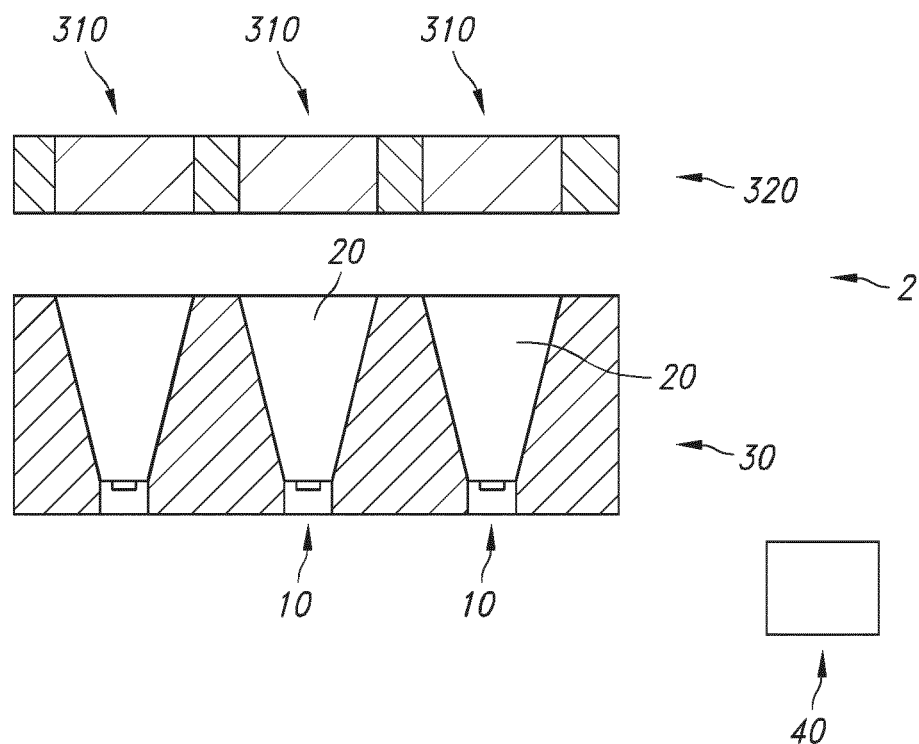
FIGS. 3a-3b schematically depict some further aspects, including an application.

FIG. 3a schematically depicts a kit of parts 2 comprising (i) a first part 30 comprising the plurality of n light sources 10 and the plurality of n first beam shaping elements 20, and (ii) one or more of the one or more single elements 320. Hence, the lighting system may be provided by providing the first part 30 comprising the plurality of n light sources 10 and the plurality of n first beam shaping elements 20, and arranging k arrays 300 of optical elements 310, to the first part 30.

As indicated above, further optical elements downstream of the optical elements 310 may be available or may not be available.

Figure 3B:
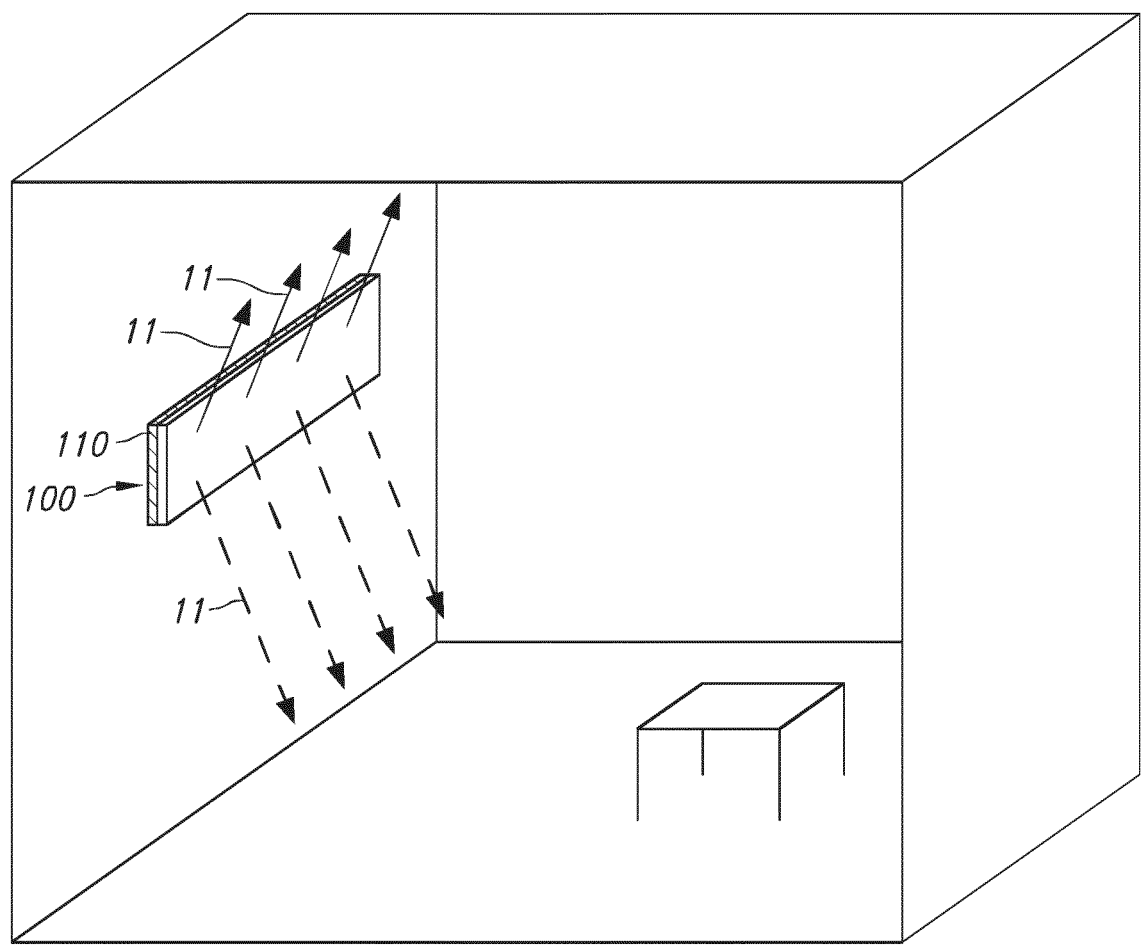

FIG. 3b schematically depicts an embodiment wherein a lighting system 100, shown as a relatively thin (lighting) device on a wall illuminates the ceiling or the floor. Light emanating from the lighting system (which may also be indicated as lighting system light) is indicated with reference 11 (as it may essentially be based on the light source light 11 generated by one or more light sources of the plurality of n light sources). Here, the light rays are also redirected. Dependent upon the arrays chosen, the different types of light directions may be provided. Of course, other embodiments may also be possible; as indicated above with embodiments of the lighting system 100 it may be possible to control one or more of (i) a beam direction, (ii) a beam shape, (iii) a spectral distribution, and (iv) an intensity of the light emanating from the lighting system.

Reference 110 indicates an embodiment of an optional heat sink. The heat sink 10 may be comprised by the lighting system 100 or the lighting system 100 may be functionally coupled to the heat sink 110. The heat sink may be used to guide heat away from the light sources and thereby cool the light sources/the lighting system 100. The heat sink 110 may e.g. be a strip of metal, like aluminum. This may provide a very elegant and unobstrusive design.

In embodiments, the lighting system may e.g. be used close to or in a shop window. Such lighting system may be used for dynamic lighting options in both time and space (and beam properties) (without essentially any wear and tear).

Alternatively, the lighting system 100 may be configured to essentially generated IR radiation. In such embodiment, the system may be used to generate a controllable heat ray.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting system comprising:
   a plurality of n light sources, wherein each of the n light sources is configured to generate light source light;
   a plurality of n first beam shaping elements, wherein each of the n first beam shaping elements (20) is configured downstream of a respective light source;
   k arrays of optical elements, wherein each of the k arrays comprises $n_k$ optical elements, wherein each of the $n_k$ optical elements is configured downstream of a respective first beam shaping element from a subset of the n first beam shaping elements; wherein the optical elements are configured to influence one or more of (i) a beam direction of the light source light, (ii) a beam shape of the light source light, (iii) a spectral distribution of the light source light, and (iv) an intensity of the light source light (11);
   wherein n≥1, k≥2, and $1 < n_k < n$,
   at least two single elements each comprising one of the k arrays,
   wherein at least two of the k arrays have complementary shapes,
   and wherein an optical element part of a first array fits in an opening of an adjacent second array, wherein the optical element part comprises a respective optical element.

2. The lighting system according to claim 1, wherein openings of the k arrays are configured downstream of one of the $n - n_k$ first beam shaping elements not belonging to the respective subset of the n first beam shaping elements, wherein one or more of the $n_k$ optical elements comprise a collimator.

3. The lighting system according to claim 2, wherein one or more of the at least two single elements have a comb-like shape, wherein each of the at least two single elements comprise one or more optical elements parts, wherein each of the one or more optical elements parts comprise a respective optical element, wherein each of the at least two single elements comprise a support, wherein along the support the optical element parts and the openings are configured.

4. The lighting system according to claim 1, wherein one or more of the openings is larger than a single optical element part, which allows hosting two optical element parts.

5. The lighting system according to claim 1, comprising a set of three arrays, wherein a first array and an adjacent second array have complementary shapes, and wherein the second array and an adjacent third array have complementary shapes.

6. The lighting system according to claim 1, wherein one or more of the k arrays are comprised by a foil, wherein the foil comprises the respective $n_k$ optical elements.

7. The lighting system according to claim 6, wherein the lighting system comprises a second foil comprising the first beam shaping elements, and wherein the n light sources comprise solid state light sources.

8. The lighting system according to claim 1, wherein one or more of the plurality of optical elements are configured to redirect the light source light of the respective light sources.

9. The lighting system according to claim 8, wherein k≥2, wherein the optical elements that are configured to redirect the light source light of the respective light sources of at least two of the k arrays are all identical but wherein a direction of a redirection of the light source light of the at least two of the k arrays mutually differ.

10. The lighting system according to claim 1, wherein one or more of the plurality of optical elements are configured to influence the light source light by one or more of (i) diffusing the light source light, (ii) reducing the intensity of the light source light, and (iii) changing the spectral distribution of the light source light.

11. The lighting system according to claim 1, wherein the plurality of n light sources comprises at least two subsets of each one or more light sources, wherein the lighting system further comprises a control system, wherein the control system is configured to control an intensity of the light source light generated by the light sources of the respective at least two subsets, and wherein one or more of the n light sources comprise solid state light sources, and wherein the light source light comprises one or more of visible radiation and IR radiation.

12. The lighting system according to claim 11, wherein light sources and the optical elements are configured such that optical properties of the light source light emanating from the system based on the light source light of the light sources of a first subset comprising one or more light sources and of a second subset comprising one or more light sources are the same within the first subset and are the same within the second subset, but mutually differ between the first subset and second subset.

13. A method of providing a lighting system according to claim 1, comprising providing a first part comprising the plurality of n light sources and the plurality of n first beam shaping elements and arranging k arrays of optical elements to the first part.

14. A method of providing the lighting system according to claim 1, comprising providing one or more of wall washing lighting, target lighting, accent lighting, attention seeking lighting, shop lighting, museum lighting, and garden lighting.

15. A kit of parts comprising (i) a first part comprising a plurality of n light sources wherein each of the n light sources is configured to generate light source light and a plurality of n first beam shaping elements wherein each of the n first beam shaping elements is configured downstream of a respective light source and (ii) two or more single elements each comprising one of k arrays of optical elements, wherein each of the k arrays comprises openings and $n_k$ optical elements, wherein respective optical elements of one of the k arrays complementarily fit into the openings of another one of the k array, and wherein the two or more single elements are configured to influence one or more of (i) a beam direction of the light source light, (ii) a beam shape of the light source light, (iii) a spectral distribution of the light source light, and (iv) an intensity of the light source light, wherein one or more of the $n_k$ optical elements comprise a collimator.

\* \* \* \* \*